United States Patent
Cottrell et al.

(10) Patent No.: US 12,054,266 B2
(45) Date of Patent: Aug. 6, 2024

(54) INTEGRATED ELECTRIC NACELLE SYSTEM AND METHOD

(71) Applicant: Aurora Flight Sciences Corporation, Manassas, VA (US)

(72) Inventors: Daniel Benjamin Cottrell, Centreville, VA (US); Mahmood Abdulrazzaq Mahmood Alwash, Alexandria, VA (US); Garrett Steven Hennig, Catlett, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 306 days.

(21) Appl. No.: 17/571,800

(22) Filed: Jan. 10, 2022

(65) Prior Publication Data

US 2022/0306305 A1 Sep. 29, 2022

Related U.S. Application Data

(60) Provisional application No. 63/167,346, filed on Mar. 29, 2021.

(51) Int. Cl.
*B64D 27/24* (2024.01)
*H01M 10/613* (2014.01)
*H01M 10/625* (2014.01)
*H01M 10/6552* (2014.01)

(52) U.S. Cl.
CPC .......... *B64D 27/24* (2013.01); *H01M 10/613* (2015.04); *H01M 10/625* (2015.04); *H01M 10/6552* (2015.04); *H01M 2220/20* (2013.01)

(58) Field of Classification Search
CPC ............ H01M 10/613; H01M 10/623; H01M 2220/20; B64D 27/30; B64D 27/34; B64D 27/357
See application file for complete search history.

(56) References Cited

U.S. PATENT DOCUMENTS

| | | | |
|---|---|---|---|
| 6,873,085 | B2 | 3/2005 | Graham |
| 7,042,121 | B2 | 5/2006 | De Filippis |
| 7,559,191 | B2 | 7/2009 | Parks |
| 7,976,291 | B2 | 7/2011 | Vinson |

(Continued)

FOREIGN PATENT DOCUMENTS

| | | |
|---|---|---|
| DE | 596337 | 6/1934 |
| EP | 2752976 A2 | 7/2014 |

(Continued)

OTHER PUBLICATIONS

Extended European search report for EU application No. 119196757.9, dated Apr. 1, 2019.

*Primary Examiner* — Christopher P Ellis
(74) *Attorney, Agent, or Firm* — Michael Stanley Tomsa; McAndrews, Held & Malloy, Ltd.; Amanda C. Jackson

(57) ABSTRACT

The present disclosure relates to propulsion system for an aircraft. The propulsion system comprises a motor, a battery bank, a thermal management system, and a controller. The motor being configured to rotate a rotor via a rotor shaft and to drive the thermal management system. The thermal management system configured to urge fluid through a fluid pathway defined by the battery bank. The controller configured to drive the motor and/or control charge and discharge of the battery bank.

13 Claims, 8 Drawing Sheets

(56) References Cited

U.S. PATENT DOCUMENTS

| | | | |
|---|---|---|---|
| 11,787,551 B1* | 10/2023 | Graves | B64C 29/0008 |
| | | | 244/56 |
| 2002/0171306 A1 | 11/2002 | Graham | |
| 2014/0370354 A1* | 12/2014 | Yang | H01M 50/227 |
| | | | 429/120 |
| 2017/0203839 A1 | 7/2017 | Giannini et al. | |
| 2020/0021163 A1 | 1/2020 | Lhotellier et al. | |
| 2020/0212410 A1* | 7/2020 | Campbell | H01M 10/643 |
| 2020/0303789 A1* | 9/2020 | Macdonald | H01M 10/625 |
| 2023/0023894 A1* | 1/2023 | Barre | F28F 9/26 |
| 2023/0187730 A1* | 6/2023 | Nubbe | H01M 50/291 |
| | | | 429/62 |
| 2023/0361378 A1* | 11/2023 | Keum | H01M 10/647 |

FOREIGN PATENT DOCUMENTS

| | | | | |
|---|---|---|---|---|
| EP | 3 231 650 A1 | 10/2017 | | |
| EP | 3290716 A1 | 3/2018 | | |
| EP | 3354903 A1 | 8/2018 | | |
| EP | 3944456 A1 * | 1/2022 | | B60L 3/0046 |
| EP | 4086176 A1 * | 11/2022 | | B64D 27/24 |
| WO | 2010/036743 A1 | 4/2010 | | |
| WO | 2017/123699 A1 | 7/2017 | | |
| WO | 2018/060565 A1 | 4/2018 | | |
| WO | WO-2024006171 A1 * | 1/2024 | | |

\* cited by examiner

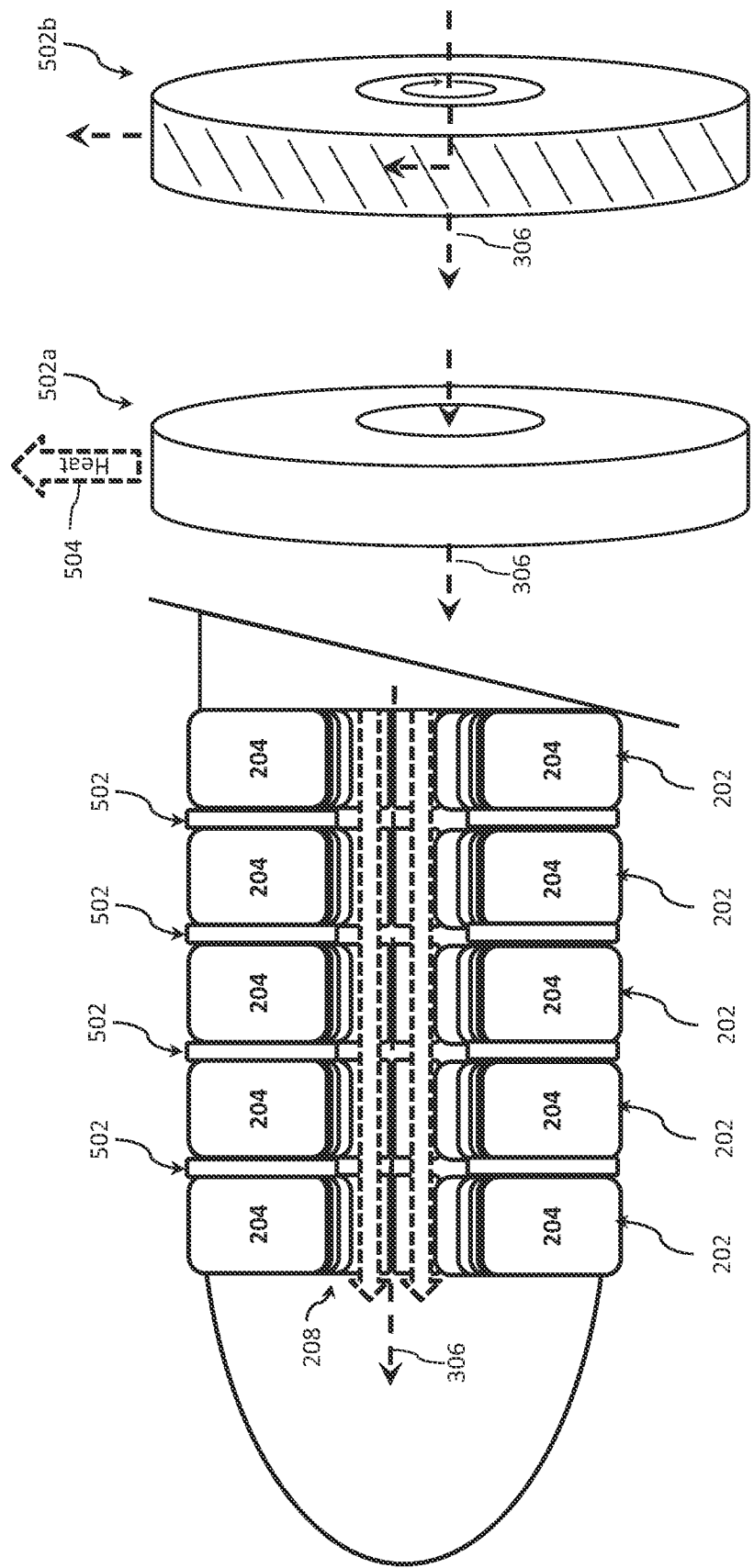

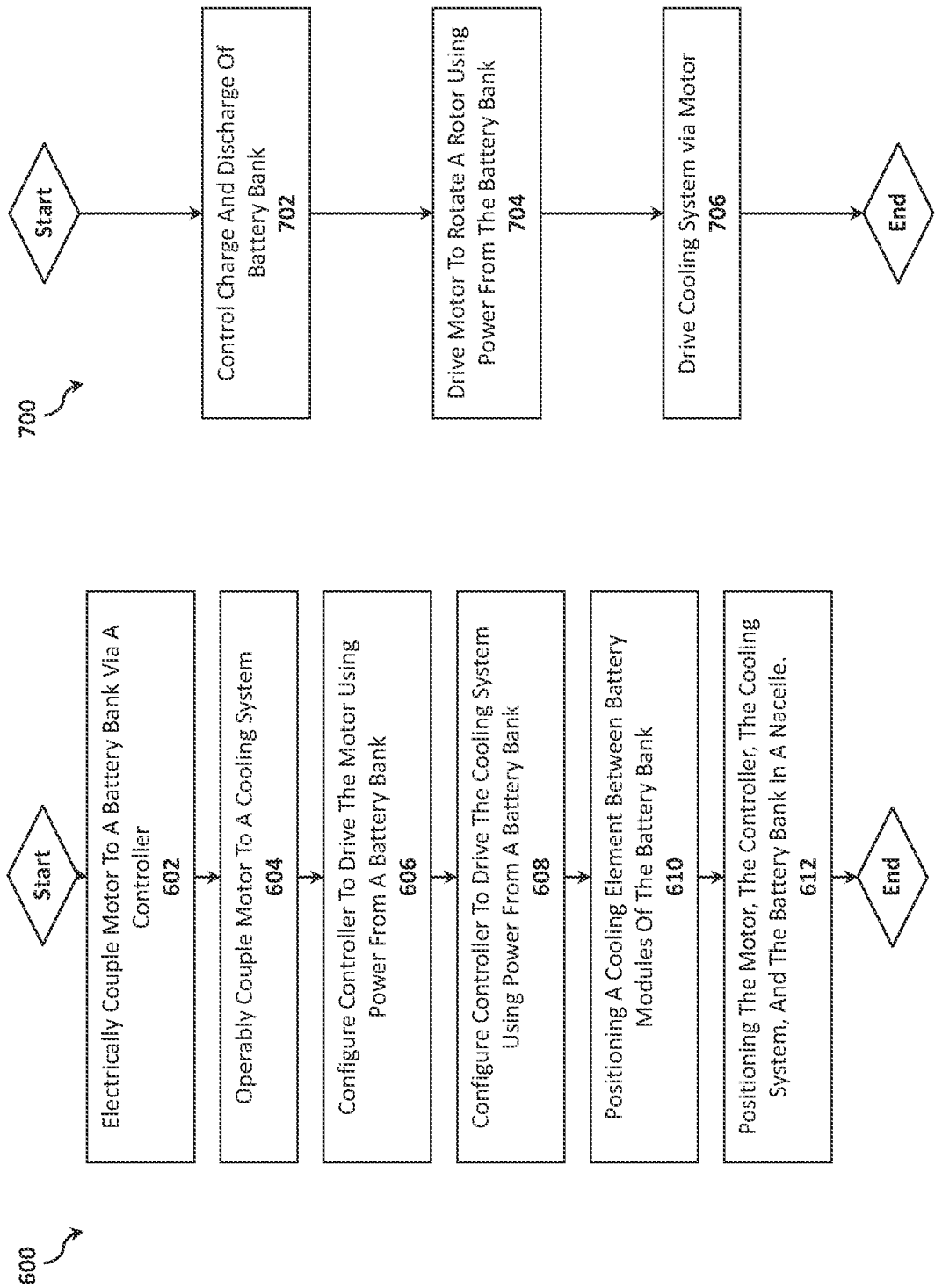

INTEGRATED ELECTRIC NACELLE SYSTEM AND METHOD

RELATED APPLICATION(S)

The present application claims priority to U.S. Provisional Patent Application No. 63/167,346, filed Mar. 29, 2021, and entitled "Integrated Electric Nacelle System and Method" which is hereby incorporated by reference in its entirety.

FIELD

The present disclosure relates to battery power systems and methods, such as those suitable for use with aircraft, more specifically, to an integrated electric nacelle system and method.

BACKGROUND

The concept of electric, hybrid-electric, and solar-powered aircraft has been demonstrated by a number of aerial vehicle research projects. These power systems typically employ a battery array (or similar battery systems) to provide and/or store power necessary for operation of the aircraft (or other vehicle).

The battery array may include one or more battery packs employing one or more battery cells of various chemistries, such as lithium-based cells. Lithium-polymer cells, for example, are higher in specific energy density per unit weight than most other battery chemistries; including nickel cadmium, lead acid, silver oxide, mercury, and alkaline dry cells. Furthermore, lithium-polymer cells have a higher voltage output per cell than many other systems; therefore, fewer cells are needed to achieve a given battery voltage. Employing such battery banks, however, can introduce some additional considerations, such as thermal management and mitigation of a battery cell failure from propagating throughout the system.

Therefore, a need exists for battery management systems and associated methods to address thermal management, while overcoming the deficiencies of the prior battery systems, such as replaceability.

SUMMARY

The present disclosure relates to battery power systems and methods, such as those suitable for use with aircraft, more specifically, to an integrated electric nacelle system and method.

According to a first aspect, a method of manufacturing a propulsion system for an aircraft comprises: electrically coupling, via a controller, a motor to a battery bank that defines a fluid pathway therethrough, wherein the motor is configured to rotate a rotor; operably coupling a thermal management system to the motor; and configuring the controller to drive the motor using power from a battery bank, wherein the motor is configured to drive the thermal management system to urge fluid through the fluid pathway.

In some examples, the method further comprises the step of configuring the controller to charge and discharge the battery bank.

In some examples, the battery bank comprises a plurality of battery packs connected electrically in parallel, wherein the method further comprises positioning a heat exchanger between each of the plurality of battery packs. The heat exchanger is a centrifugal fan.

In some examples, the method further comprises the step of positioning the motor, the controller, the thermal management system, and the battery bank in a nacelle.

In some examples, the thermal management system is configured to urge fluid from a forward end of the nacelle to an aft end of the nacelle via the fluid pathway.

In some examples, the method further comprises the step of configuring the propulsion system as a line-replaceable unit (LRU).

According to a second aspect, a propulsion system for an aircraft comprises: a battery bank that defines a fluid pathway therethrough; a motor configured to rotate a rotor via a rotor shaft; a controller configured to drive the motor; and a thermal management system configured to urge fluid through the fluid pathway.

In some examples, the battery bank comprises a plurality of battery packs connected electrically in parallel. Each of the plurality of battery packs may comprises a plurality of battery cells. The plurality of battery cells may be arranged to define a ring, wherein the fluid pathway passes through said ring. In some examples, the plurality of battery packs are removably coupled to one another.

In some examples, the motor is configured to drive the thermal management system. The thermal management system may comprise a heat exchanger or a fan. The fan can be mechanically coupled to the rotor shaft.

In some aspects, a heat exchanger is provided between each of the plurality of battery packs. The heat exchanger may be, for example a centrifugal fan or a heat sink.

In some examples, the controller, which may be integrated with the motor, is configured to control charge and discharge of the battery bank.

In some examples, the battery bank, the motor, the controller, and the thermal management system are each positioned in a nacelle and/or configured as a line-replaceable unit (LRU).

In some examples, the motor is provided at a forward end of the nacelle, a tail cone is positioned at an aft end of the nacelle, and the battery bank is positioned aft of the motor and forward of the tail cone.

In some examples, the plurality of battery cells are lithium battery cells.

In some examples, the lithium battery cells are cylindrical cells or pouch cells.

According to a third aspect, a method of cooling a propulsion system in an aircraft comprises: controlling, via a controller, charge and discharge of a battery bank, wherein the battery bank defines a fluid pathway therethrough; driving, via the controller, a motor to rotate a rotor, wherein the motor derives power from the battery bank; and driving, via the motor, a thermal management system that is configured to urge fluid through the fluid pathway.

In some examples, the battery bank, the motor, the controller, and the thermal management system are each positioned in a nacelle, wherein the thermal management system is configured to urge fluid from a forward end of the nacelle to an aft end of the nacelle via the fluid pathway.

In some examples, the thermal management system comprises a heat exchanger and/or a fan.

DRAWINGS

The foregoing and other objects, features, and advantages of the devices, systems, and methods described herein will be apparent from the following description of particular embodiments thereof, as illustrated in the accompanying figures; where like reference numbers refer to like structures.

The figures are not necessarily to scale, emphasis instead being placed upon illustrating the principles of the devices, systems, and methods described herein.

FIG. 1b illustrates a block diagram of an example propulsion system of the example aircraft of FIG. 1a.

FIG. 2a illustrates perspective view of the example propulsion system of the example aircraft of FIG. 1a.

FIG. 2b illustrates a side view of the example propulsion system of FIG. 2a.

FIG. 2c illustrates perspective assembly view of the example propulsion system of FIG. 2a.

FIG. 5a illustrates a block diagram of an example battery bank with heat exchangers.

FIG. 5b illustrates a perspective view of an example heat exchanger in accordance with a first example.

FIG. 5c illustrates a perspective view of an example heat exchanger in accordance with a second example.

FIG. 6 illustrates a flow chart of an example method of manufacturing a propulsion system.

FIG. 7 illustrates a flow chart of an example method of cooling a propulsion system.

DESCRIPTION

Figure 1A:
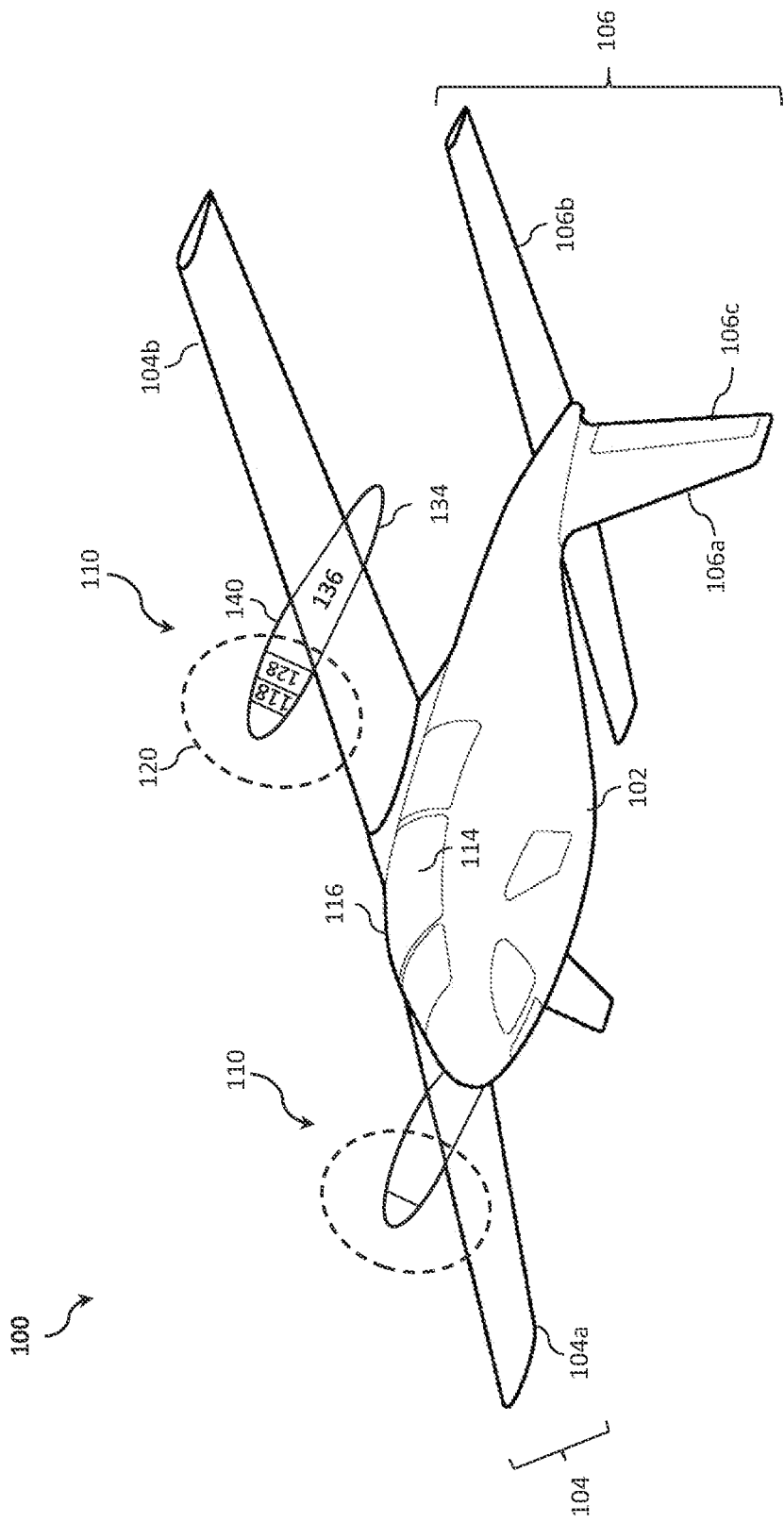
FIG. 1a illustrates a perspective view of an example aircraft suitable for use with the propulsion system in accordance with one aspect.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms.

As used herein, the terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. The terms "e.g.," and "for example" set off lists of one or more non-limiting examples, instances, or illustrations. No language in the specification should be construed as indicating any unclaimed element as essential to the practice of the embodiments.

As used herein, the terms "aerial vehicle" and "aircraft" are used interchangeably and refer to a machine capable of flight, including, but not limited to, both traditional runway and vertical takeoff and landing ("VTOL") aircraft, and also including both manned and unmanned aerial vehicles ("UAV"). VTOL aircraft may include fixed-wing aircraft (e.g., Harrier jets), rotorcraft (e.g., helicopters, multirotor, etc.), and/or tilt-rotor/tilt-wing aircraft.

As used herein, the term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

As used herein, the terms "circuits" and "circuitry" refer to physical electronic components (i.e., hardware) and any software and/or firmware ("code"), which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

As used herein, the term "composite material" as used herein, refers to a material comprising an additive material and a matrix material. For example, a composite material may comprise a fibrous additive material (e.g., fiberglass, glass fiber ("GF"), carbon fiber ("CF"), aramid/para-aramid synthetic fibers, etc.) and a matrix material (e.g., epoxies, polyimides, and alumina, including, without limitation, thermoplastic, polyester resin, polycarbonate thermoplastic, casting resin, polymer resin, acrylic, chemical resin). In certain aspects, the composite material may employ a metal, such as aluminum and titanium, to produce fiber metal laminate (FML) and glass laminate aluminum reinforced epoxy (GLARE). Further, composite materials may include hybrid composite materials, which are achieved via the addition of some complementary materials (e.g., two or more fiber materials) to the basic fiber/epoxy matrix.

As used herein, the terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

As used herein, the term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

As used herein, circuitry or a device is "operable" of "configured" to perform a function whenever the circuitry or device comprises the necessary hardware and code (if any is necessary) to perform the function, regardless of whether performance of the function is disabled, or not enabled (e.g., by a user-configurable setting, factory trim, etc.).

FIG. 1a illustrates a perspective view of an example aircraft suitable for use with a propulsion system 110 in accordance with one aspect. The aircraft 100 generally comprises an airframe 102 (e.g., a fuselage) having a wing set 104 having a starboard-side wing 104a and a port-side wing 104b. While the wing set 104 is illustrated as generally linear with tapered outboard wing tips, other wing configurations are contemplated, such as back-swept, non-tapered, rectangular, elliptical, forward-swept, and the like. The airframe 102 further includes an empennage 106 with one or more vertical stabilizers 106a and/or horizontal stabilizers 106b, which may be configured in one of multiple different tail configurations. To assist with controlled flight, the aircraft 100 may further comprise one or more moveable control surfaces. For example, each of the wing set 104 and/or vertical stabilizers 106a may include a fixed leading section and a moveable portion pivotally coupled to a trailing edge of the fixed leading section, such as one or more trailing edge flaps, trim tabs, and/or rudder 106c.

The aircraft 100 can be configured to carry passengers and/or cargo. As illustrated, the airframe 102 includes a cockpit/cabin 114 for one or more human operators and/or passengers. The aircraft 100 may be used as, for example, an air taxi, emergency vehicle (e.g., ambulance), pleasure craft, cargo transport, etc. The illustrated cockpit/cabin 114 includes a forward facing transparent aircraft canopy 116 that may be fabricated from, for example, a glass material, and/or an acrylic material. The aircraft 100 is generally illustrated as having a cockpit for manned operation, but may also be configured as unmanned (i.e., requiring no onboard pilot) or as both unmanned and fully autonomous (i.e., requiring neither an onboard pilot nor a remote control pilot). For example, the aircraft 100 may be remotely controlled over a wireless communication link by a human operator, computer operator (e.g., remote autopilot), or base station. In an unmanned arrangement, the cockpit/cabin 114 may be omitted.

The various structural components of the aircraft 100 may be fabricated from metal, a metal alloy, a composite material, wood, plastic (or other polymer), or a combination thereof. In certain aspects, portions of the aircraft 100 (e.g., the airframe 102 and/or the wing set 104) may be fabricated using one or more additive manufacturing/3D printing techniques, such as fused deposition modeling (FDM), stereolithography (SLA), selective laser sintering (SLS), and/or any other suitable type of additive manufacturing/3D printing.

The illustrated aircraft 100 includes a plurality of propulsion systems 110 to generate thrust. The plurality of propulsion systems 110 may be positioned on the airframe 102, the wing set 104, the empennage 106, one or more booms, or a combination thereof. The propulsion systems 110 may spin its rotors 120 in a clockwise or a counter-clockwise direction about its respective axis of rotation, which may be a fixed axis of rotation or a pivoting axis of rotation (e.g., a tilt wing or tilt rotor configuration). In certain aspects, propulsion systems 110 on one side of the airframe 102 may spin its rotors 120 in a clockwise direction, while the propulsion system 110 on the other side of the airframe 102 may spin its rotors 120 in a counter-clockwise direction. One of skill in the art would appreciate that the blade pitch of the rotor blades 120a would be adjusted depending on the rotational direction. The number and locations of the propulsion systems 110 shown in FIG. 1a are merely for example, and can vary as desired.

Each of the propulsion systems 110 generally comprises an electric motor 118 coupled to, and configured to drive/rotate, a rotor 120 about its axis of rotation to generate thrust. Each of the plurality of propulsion systems 110 are oriented to direct thrust to facilitate controlled flight, whether VTOL or cruise operation. As illustrated, the one or more propulsion systems 110 are oriented to generate a horizontal thrust (a cruise thrust) relative to the airframe 102 (e.g., parallel to the roll axis of the aircraft 100) during the cruise operation. During the cruise operation, the wing set 104 sustains wing-borne flight for the aircraft 100, thus unloading the plurality of propulsion system 110. As will be appreciated by those of ordinary skill in the art, wing-borne flight refers to the type of flight where lift is provided to an aircraft via one or more airfoils (e.g., wing set 104).

While illustrated as coupled to the wing set 104, the plurality of propulsion systems 110 can alternatively or additionally be coupled to the wing set 104 via one or more booms or to other structural components of the aircraft to provide thrust, such as the airframe 102, empennage 106, etc. Similarly, while two propulsion systems 110 are illustrated as coupled to the wing set 104, additional propulsion systems 110 may be provided to increase thrust. The one or more propulsion systems 110 may be arranged in either a pusher configuration or a tractor configuration (as illustrated).

Figure 1B:
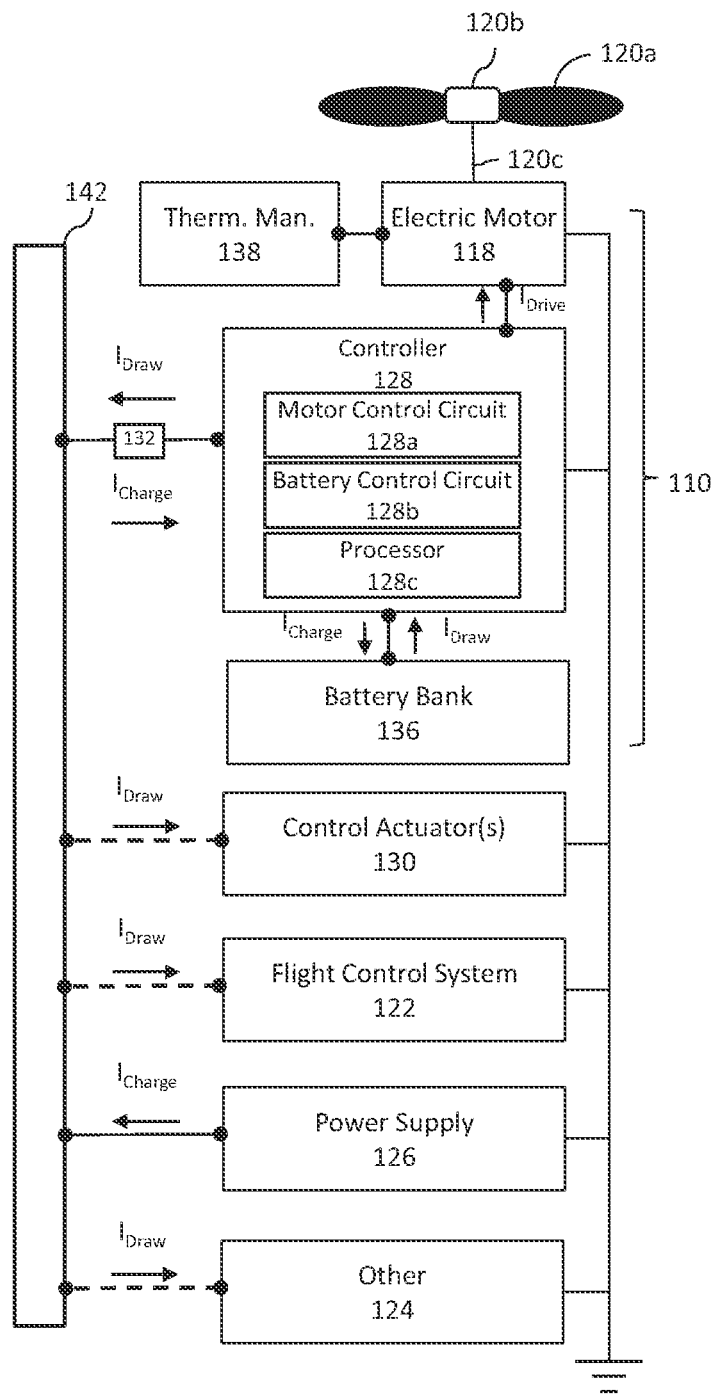

FIG. 1b illustrates a block diagram of an example propulsion system 110 of the example aircraft of FIG. 1a. As will be explained below, the propulsion system 110 may be configured as a line-replaceable unit (LRU), which may communicatively coupled with a higher level control system, such as the flight control system 122. To that end, the various components of the propulsion system 110 may be provided in a single housing or package (e.g., nacelle). An advantage of an LRU is that the propulsion system 110 may be readily removed and/or replaced to facilitate repairs, maintenance, etc. without removing the aircraft 100 from services for an extended period of time. Moreover, configuring each propulsion system 110 as a self-contained system (e.g., having its own battery bank 136, controller 128, etc.) mitigates risk of a failure from propagating to other components of the aircraft 100. For example, if the battery bank 136 fails, other components of the aircraft 100 would not be directly affected. Thus, locating the components of the propulsion system 110 centrally reduces the complicated and dangerous interfaces between the propulsion system 110 and the rest of the aircraft 100. This simplifies maintenance and opens the possibility for line replicability. For instance, if a unit breaks it can be rapidly swapped by personnel without high voltage training. Broken propulsion systems 110 can be transferred to personnel offsite whom specialize in high voltage systems, thus promoting specialization that offers savings in large scale operations. Further, collocating all the high energy components in the nacelle 140 makes the system safer for users, maintainers, and rescue personnel. While people typically have an intuition that rotors 120 are dangerous, it is more difficult to judge the level of danger of batteries and high voltage power electronics. In the event of accident and rescue personnel need to cut open the cockpit/cabin 114, it reduces the chance of cutting into a high voltage wire if all HV components are out of the airframe 102. In the event of a battery fire, the fumes are generated outside of the cockpit/cabin 114.

The propulsion system 110 uses the battery bank 136 to power its various electric loads. By way of illustration, battery bank 136 of the propulsion system 110 may provide, in aggregate, about 1 kWh to 1 MWh in total energy storage to the propulsion system 110 (and/or to other components of the aircraft 100) when fully charged. As can be appreciated, however, the amount of energy storage can be increased or decreased by adjusting the number of batteries or battery cells in the battery bank 136 to achieve a desired amount of energy storage. A power bus 142 electrically couples, whether directly or indirectly, the battery bank 136 with the various electric loads and power supplies of the propulsion system 110 and/or aircraft 100, thereby facilitating charge and discharge of the battery bank 136.

Electric loads of the propulsion system 110 that receive a current draw ($I_{Draw}$) from the battery bank 136 to discharge the battery bank 136 may include, for example, the electric motor 118, the thermal management system 138 (if electric power is needed), and the controller 128. As illustrated, the electric motor 118 draws power from the battery bank 136 via the controller 128. A separate or dedicated battery bank may be provided in the airframe 102 to power other components of the aircraft 100, such as control actuators 130 (e.g., those to control flight surfaces, such as wing and tail servos), flight control system 122 (or other avionics), and other loads 124 that may be used during operation of the aircraft 100, such as an intelligence surveillance reconnaissance (ISR) payload. However, the battery bank 136 of the propulsion system 110 may further be configured to supply power to the aircraft 100 (e.g., in the event of a power failure, low state of charge, etc.). To that end, the control actuators 130, flight control system 122, and other loads 124 can be configured to draw power via power bus 142 via a switch as indicated by the broken lines, if needed or desired.

In the illustrated example, a single controller 128 can serve as both the motor control circuit 128a and the battery control circuit 128b. For example, a single processor 128c (and associated circuitry) may be used to monitor and control the electric motor 118 and the battery bank 136. In some examples, the controller 128 may be integrated with the electric motor 118. Separate controllers and/or processors, however, may be used to provide the functionality of the motor control circuit 128a and the battery control circuit 128b.

The battery bank 136 may be recharged over the power bus 142 using a charge current ($I_{Charge}$) from a power supply 126, which may be onboard the aircraft 100, external to the aircraft 100, or a combination thereof. For example, the power supply 126 may be an onboard engine-driven generator (e.g., a hybrid-electric arrangement) or an onboard renewable energy source (e.g., solar panels). Additionally or alternatively, the power supply 126 may be a charging station on the ground that uses line current to create the charge current ($I_{charge}$) to recharge the battery bank 136.

Figure 2A:
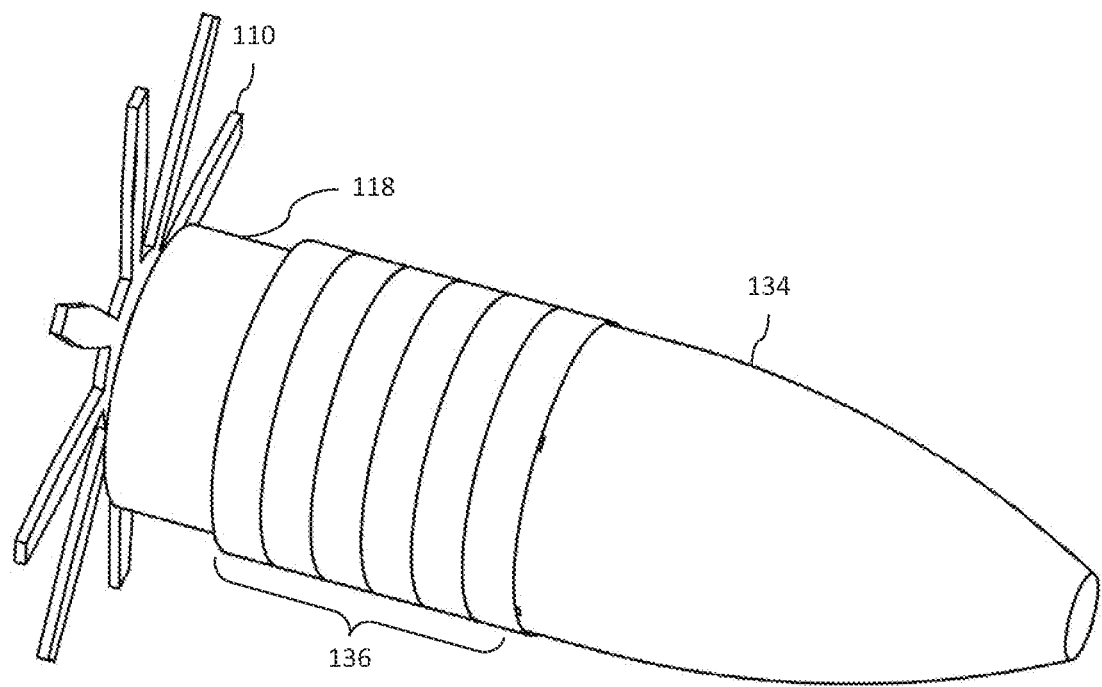
Figure 2B:
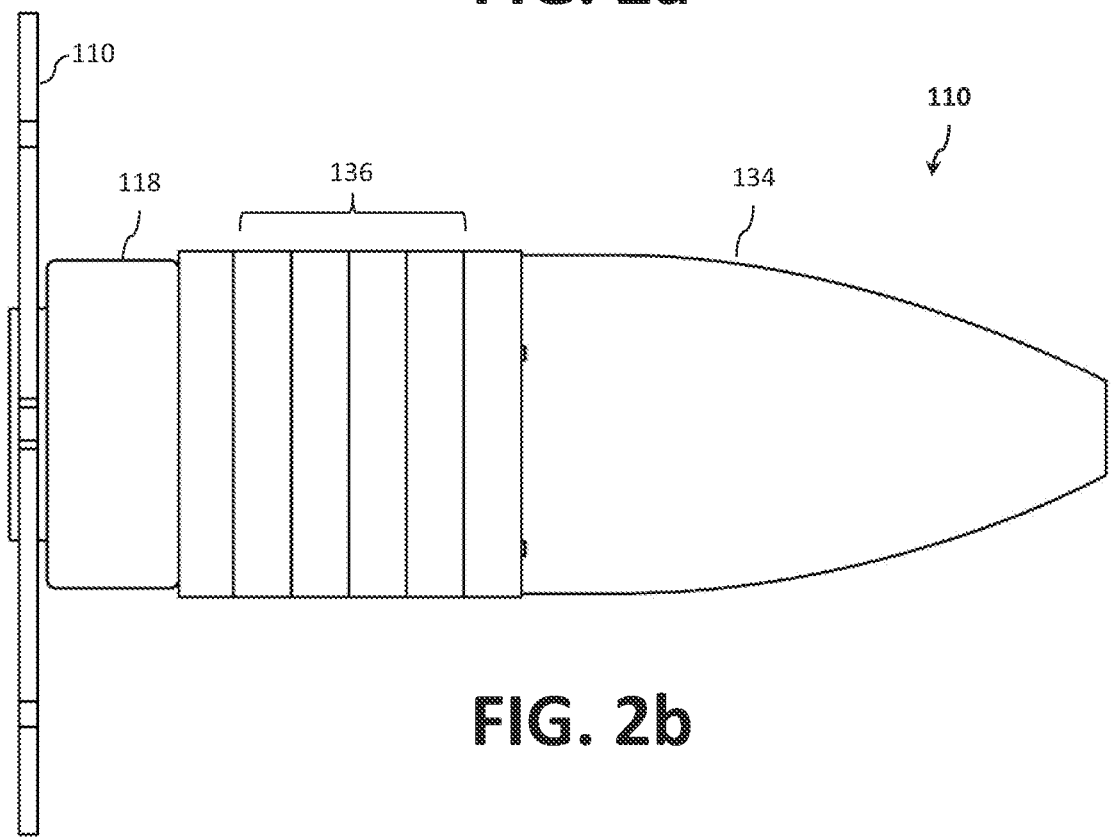
Figure 2C:
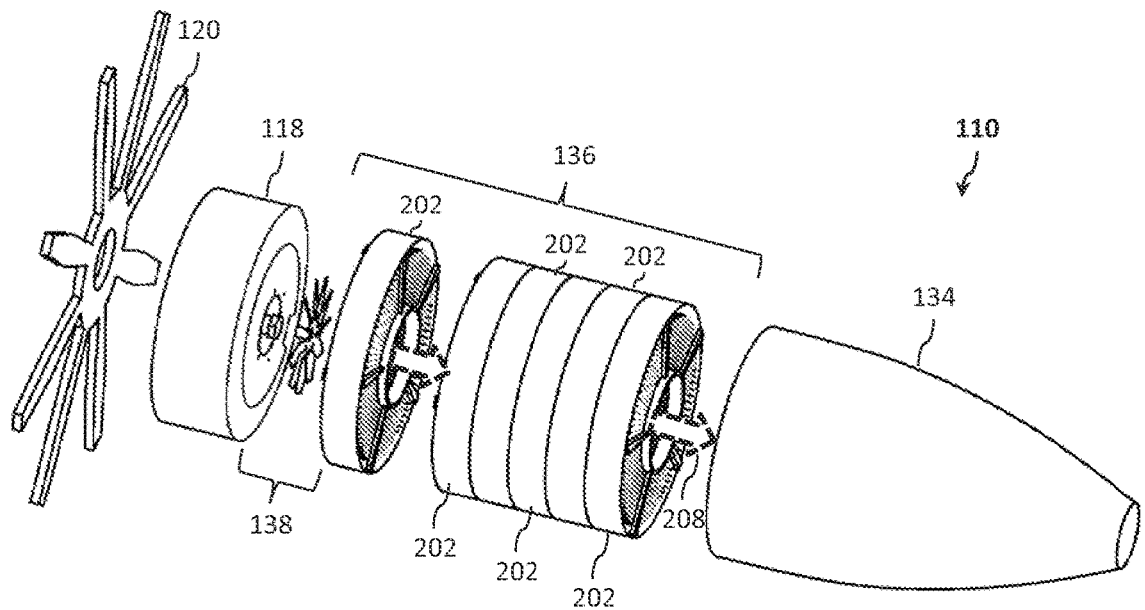
Figure 2D:
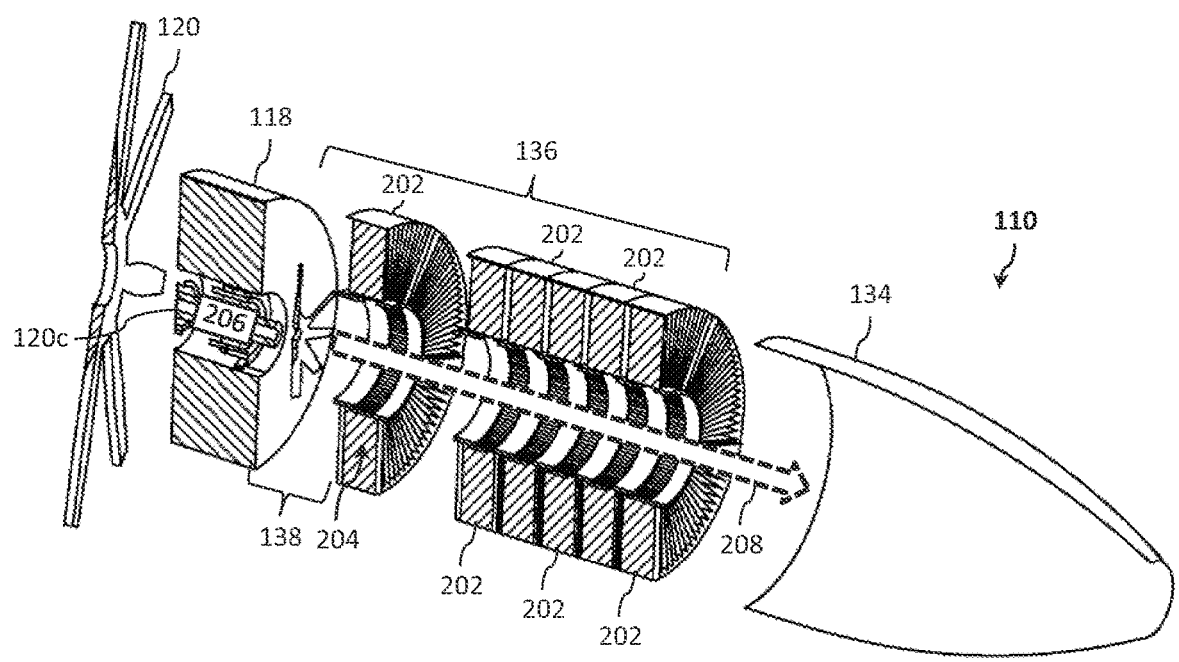
FIG. 2d illustrates a cross sectional view of the example propulsion system taken along A-A of FIG. 2c.

FIG. 2a illustrates perspective view of the example propulsion system 110 of the example aircraft 100, while FIG. 2b illustrates a side view of the example propulsion system 110. FIGS. 2c and 2d illustrate, respectively, a perspective assembly view and a cross sectional view taken along A-A of the example propulsion system 110. As illustrated, the propulsion system 110 comprises the battery bank 136, the electric motor 118, the thermal management system 138, and the controller 128. The propulsion system 110 offers a number of advantages, such as reducing mass and providing more efficient thermal management solutions. Further, positioning the battery bank 136 in the nacelle 140 obviates a need for a centralized energy storage system, thus freeing up space in the airframe 102 for payload and moves hazardous batteries away from that payload (e.g., passengers).

The battery bank 136, the electric motor 118, the controller 128, and the thermal management system 138 are each positioned in a nacelle 140. As illustrated, the electric motor 118 is provided at a forward end 140a of the nacelle 140, a tail cone 134 is positioned at an aft end 140b of the nacelle 140, and the battery bank 136 is positioned in between (e.g., aft of the electric motor 118 and forward of the tail cone 134). In some examples, the battery bank 136, the electric motor 118, the controller 128, and the thermal management system 138 is positioned in a nacelle 140 and configured as a line-replaceable unit (LRU).

The rotor 120 generally comprise a plurality of rotor blades 120a radially coupled to a rotor hub 120b. The electric motor 118 is configured to rotate the rotor 120 via the rotor hub 120b about an axis of rotation using a rotor shaft 120c. The electric motor 118 may be a brushed or brushless electric motor controlled via the motor control circuit 128a, such as an electronic speed controller (ESC) unit. A motor control circuit 128a refers to an electronic circuit configured to convert the current draw ($I_{Draw}$) from the battery bank 136 to an adjustable drive current ($i_{Drive}$) to vary a speed of the electric motor 118 (motor speed), its direction, and, when desired, to act as a dynamic brake. For example, the motor control circuit 128a may employ one or more inverters The motor control circuit 128a may be coupled (or otherwise integrated) with the aircraft 100 (e.g., along with the electric motor 118 as part of a nacelle). One or more electrical safety devices 132 (e.g., fuses, e-Fuses, circuit breakers, resettable fuses, such as a polymeric positive temperature coefficient (PPTC) devices, etc.) may be provided in-line between the power bus 142 and the controller 128 to provide over-current protection.

The battery bank 136 supplies power to operate components of the propulsion system 110. The battery bank 136 comprises a plurality of battery packs 202 connected electrically in parallel or in series to achieve a desired nominal voltage and/or battery capacity. While six battery packs 202 are illustrated, additional or fewer battery packs 202 may be employed to achieve a target battery capacity (e.g., to provide adequate power for a given aircraft, flight plan, and/or electric loads). By way of illustration, battery bank 136 of the aircraft 100 may include about 2 to 12 battery packs 202. Each of the plurality of battery packs 202 comprises a plurality of battery cells 204 electrically connected to one another to define a battery string. The battery packs 202 may be configured (e.g., sized) such that each of the battery packs 202 provides the same nominal voltage. The number of battery cells 204 and battery packs 202 employed in the battery bank 136 may be selected as a function of target capacity, target voltage, and target weight (e.g., max weight) of the overall battery bank 136. In some examples, a fixed battery string architecture (e.g., hardwired string of battery cells 204) can be used to minimize the footprint (e.g., size, weight, power requirements, etc.) of the battery bank 136.

In other examples, the battery bank 136 may be configured to intelligently reconfigure the number of battery packs 202 electrically connected to the battery bank 136 via, for example, processor 128c. To that end, the battery bank 136 may allow for dynamic reconfiguration at various levels of control granularity (e.g., per battery pack 202, per battery cell 204, etc.). For example, the battery bank 136 can regulate the output voltage or capacity by dynamically selecting a subset of all available battery packs 202 or battery cells 204 in to (online) or out of (offline/bypass) the battery bank 136 via one or more switches (e.g., relays and/or solid state switches). A reconfigurable battery bank 136 also provides the ability to address defective battery packs 202 within the battery bank 136 by bypassing one or battery packs 202 in the event of failure. Therefore, if needed, a defective component of the battery bank 136 can be switched offline and substituted to provide further fault protection. In some examples, the battery bank 136 may include a reserve battery pack 202 that can be switched in to replace a defective battery pack 202.

The plurality of battery packs 202, in some examples, are removably coupled to one another via one more blind connections. The battery packs 202 within a battery bank 136 may be electrically connected to one another via one or more interconnectors to facilitate the passing of power and/or data signals from one battery pack 202 to another battery pack 202 (e.g., an adjacent battery pack 202). The interconnectors may employ, for example, a first connector (e.g., a female connector) and a second connector (e.g., a male connector) configured to mate with one another. For example, when the battery packs 202 are arranged to define a battery bank 136, power and/or data signals may be conveyed, or otherwise communicated, from one end (e.g., proximal end) of a battery bank 136 to an opposite end (e.g., distal end) of the battery bank 136 via the interconnectors; each of which can provide pass through functionality in the event of an battery pack 202 exhibiting less than optimal performance. In certain aspects, a battery bank 136 can be expanded and contracted as needed via the interconnectors (e.g., additional battery packs 202 may be connected or disconnected) to address power needs and/or replace defective units. As can be appreciated, the interconnection wires or bus bars (e.g., power bus 142) are shorter and therefore weigh less and require less supporting structure. In general, a more compact system will result in lower structural mass. The shorter interconnection wires or bus bars also reduce resistive/impedance losses.

Each of the plurality of battery packs 202 comprises a plurality of battery cells 204. The battery cells 204 may be provided using one or more cell package styles, such as cylindrical cells, prismatic cells, and/or pouch cells. The battery cells 204 may be lithium battery cells (i.e., lithium-based cells), such as lithium ion and lithium polymer cells. To increase heat dissipation, the battery bank 136 defines a fluid pathway 208 therethrough. For example, the plurality of battery cells 204 can be arranged radially to define a ring (i.e., an annulus), wherein the fluid pathway 208 passes through center hole of said ring. In the illustrated example, a plurality of pouch cells may be arranged radially with their respective electrical tabs (i.e., positive and negative connection terminals) coupled to one another and arranged in a housing to define the battery pack. In some examples, the electrical tabs are oriented toward the fluid pathway 208.

The thermal management system 138 is configured to urge fluid through the fluid pathway 208. The thermal management system 138 may comprise one or more of a heat exchanger 402, a fan 302, etc. The heat exchanger 402 may be, for example, an active heat exchanger 402 powered by pump. The fluid may be, for example, gas (e.g., air) or liquid (e.g., water, engine coolant, etc.). When a liquid is used, the fluid is circulated via, for example, coils to maintain separate between the liquid and the internal components. The electric motor 118 may be configured to drive both the rotor 120 and the thermal management system 138. For example, the fan 302 can be mechanically coupled to the rotor shaft 120c and configured to rotate with the rotor 120. In some examples, the rotor 120 and the fan 302 may operate at the same RPM. In other examples, a gearbox 206 having a gearing ratio may be provide to decrease (or increase) the RPM of the fan 302 relative to the rotor 120. The gearing ratio may be fixed or adjustable. For example, the gearing ratio may be adjusted dynamically (e.g., during operation) via controller 128 to increase the RPM of the fan 302 based on, for example, a measured temperature (e.g., temperature of the electric motor 118, controller 128, battery bank 136, etc.). In another example, an input of the heat exchanger 402 can be mechanically coupled to the rotor shaft 120c and configured to rotate with the rotor 120 to drive a pump of the heat exchanger 402. As discussed above with the fan 302, a gearbox 206 having a gearing ratio may be provide to decrease (or increase) the RPM at the input of the heat exchanger 402 relative to the rotor 120.

In addition to controlling the electric motor 118, the controller 128 is configured to control charge and discharge of the battery bank 136, thereby serving as a battery management system. As batteries age (over multiple charge/discharge cycles), the impedance/resistance, and capacity degrade and battery cell characteristics diverge. Sensor information, which may be in the form of digital data signals from one or more sensors in the battery bank 136 (e.g., voltage sensor, current sensors, strain sensors, thermistor, etc.), is therefore evaluated by the controller 128 (e.g., via processor 128c) and associated software (or, if desired, a higher level control system, such as flight control system 122) to determine, inter alia, the state of charge (SoC), state of health (SoH), and equivalent resistance of each battery pack 202, which may be updated in real time (or near real time) or on a periodic basis (e.g., every 1 to 5 minutes). For example, the controller 128 may determine the SoC of the battery pack 202 in one or more ways. When the battery pack 202 is disconnected from the power bus 142, the SoC of the battery pack 202 can be determined by measuring the open circuit voltage (OCV) of the battery pack 202. When the battery pack 202 is connected, the SoC of the battery pack 202 can be estimated by measuring the in-and-out-flowing current. One technique for estimating the SoC of a battery using the in-and-out-flowing current is known as the coulomb counting method (also known as ampere hour counting and current integration). The coulomb counting method employs battery current readings mathematically integrated over the usage period to calculate SoC values. The coulomb counting method then calculates the remaining capacity simply by accumulating the charge transferred in or out of the battery. In some examples, the controller 128 is integrated with the electric motor 118.

Figure 3:
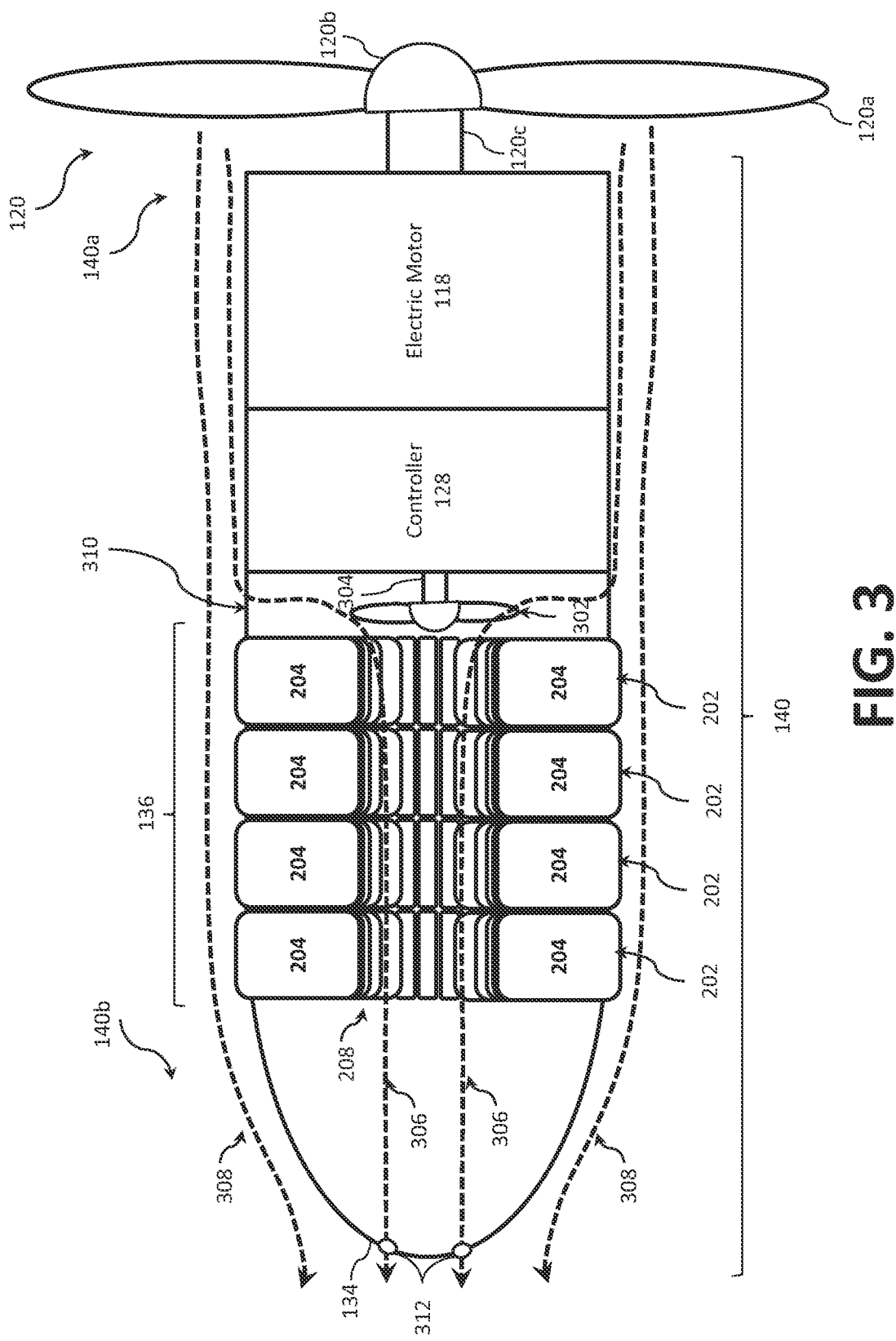
FIG. 3 illustrates a block diagram of an example propulsion system with a thermal management system in accordance with a first example.

FIG. 3 illustrates a diagram of an example propulsion system 110 with a thermal management system 138 in accordance with a first example. The diagram is a cross sectional view taken along A-A FIG. 2c. As illustrated, the rotor 120 is positioned at the forward end 140a of the nacelle 140 and configured to generate thrust when rotated via the rotor shaft 120c. The cooling air 308 (e.g., propwash) created by the rotor 120 passes along the outer surface of the nacelle 140 from a forward end 140a of the nacelle 140 to an aft end 140b of the nacelle 140. The cooling air 308 helps to dissipate heat at the outer surface of the nacelle 140. As illustrated, the thermally sensitive components are concentrated near the electric motor 118. Though the local heat production per volume may be greater, the thermal management system 138 may be smaller and more focused. A benefit is that heat generating components are located near the region of high-speed flow behind the rotor 120. Thus, convective cooling is more effective and comes at a relatively low energy cost.

A portion of surface of the nacelle 140 between the electric motor 118 and the battery bank 136 comprises one or more openings 310 (e.g., vents, slots, slats, etc.) to enable an amount of cooling air 308 to pass through the skin of the nacelle 140 and to enter the nacelle 140. The cooling air 308 can be drawn in through the one or more openings 310 via, for example, a fan 302. The fan 302 may be rotated by a fan shaft 304, which driven by electric motor 118. In some examples, the fan shaft 304 may be the aft end of the rotor shaft 120c. In other examples, the fan shaft 304 may be coupled to the rotor shaft 120c, either directly or via a gearbox 206. In addition to drawing the cooling air 308 through the one or more openings 310, the fan 302 urges (e.g., pushes) cooling air 306 through the fluid pathway 208 that passes through the battery bank 136. The cooling air 306 may exit the nacelle 140 at the aft end 140b via one or more exhaust vents 312 (e.g., defined in the tail cone 134) or recirculate back to the forward end 140a (e.g., between the outer surface of the battery bank 136 and the inner surface of the nacelle 140). In some examples, the tail cone 134 may be used to house additional circuitry or other electronics, which can also be cooled by the cooling air 306. While illustrated between the electric motor 118 and the battery bank 136, in some examples, the fan 302 may be additionally or alternatively positioned at the aft end 140b (e.g., in the tail cone 134) and configured to pull the cooling air 306 through the fluid pathway 208.

Figure 4:
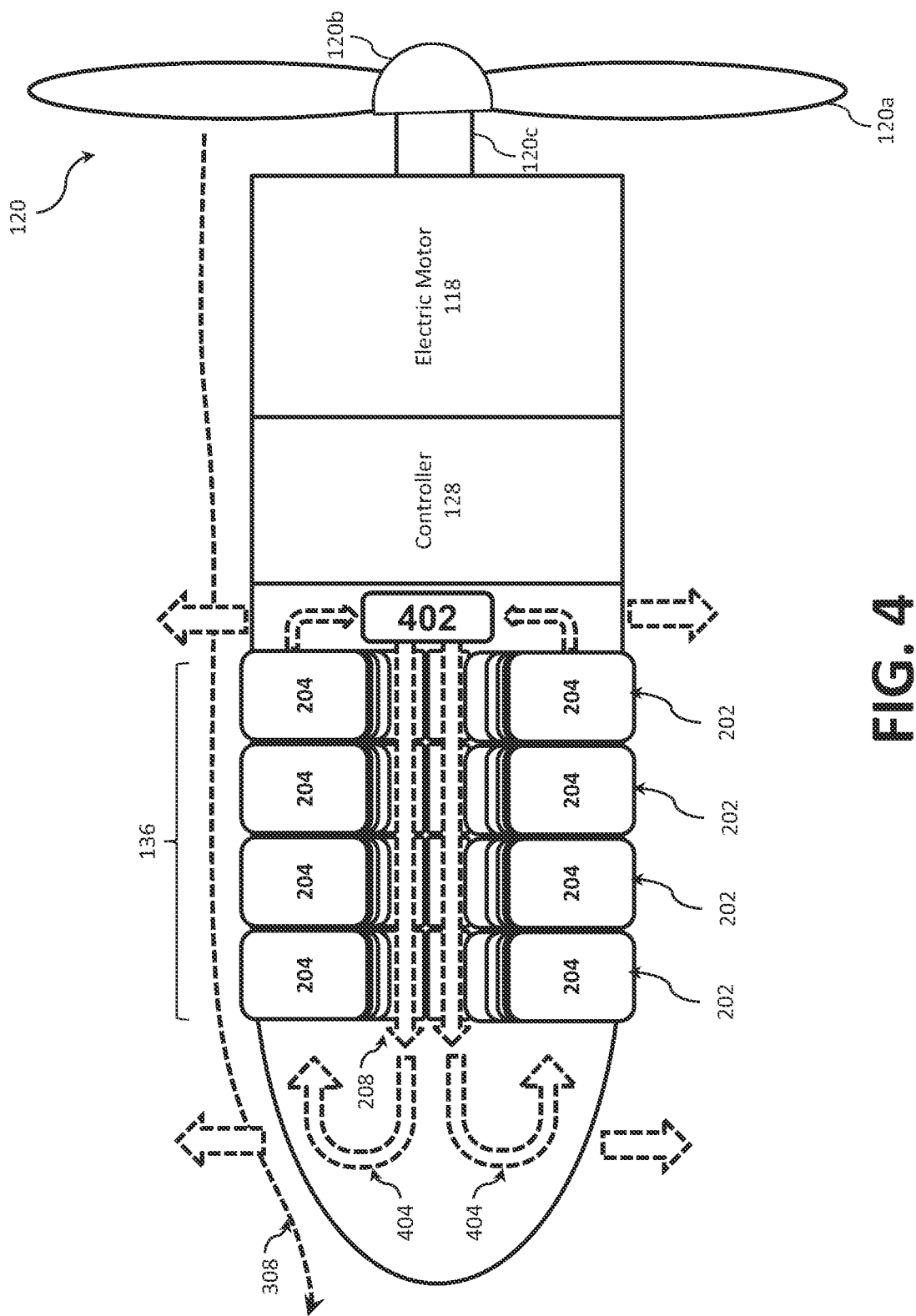
FIG. 4 illustrates a block diagram of an example propulsion system with a thermal management system in accordance with a second example.

FIG. 4 illustrates a diagram of an example propulsion system 110 with a thermal management system in accordance with a first example. The diagram is a cross sectional view taken along A-A FIG. 2c. As described in connection with FIG. 3, the rotor 120 is positioned at the forward end of the nacelle 140 and configured to pass cooling air 308 along the outer surface of the nacelle 140 to dissipate heat at the outer surface of the nacelle 140. Rather than passing gas (e.g., air) through the fluid pathway 208 via a fan 302, however, the example of FIG. 4 uses a heat exchanger 402 to dissipated heat from within the nacelle. For example, the heat exchanger 402 may employ a pump configured to urge and/or recirculate fluid (whether a gas or liquid) through cooling coils 404 (or another form of tube). In some examples, the liquid may be water, engine coolant (e.g., antifreeze), oil, etc. In some examples, the drive input to the heat exchanger 402 may be coupled to the rotor shaft 120c, either directly or via a gearbox 206. That is, the pump of the heat exchanger 402 may be driven by the electric motor 118.

FIG. 5a illustrates a block diagram of an example battery bank 136 with heat exchangers 502 positioned between each of the plurality of battery packs 202, while FIGS. 5b and 5c illustrate perspective views of example heat exchangers 502. As illustrated in FIG. 5a, a heat exchanger 502 can be provided between each of the plurality of battery packs 202.

With reference to FIG. 5b, in some examples, heat exchanger 502 is a heat sink 502a. The heat sink 502a operates as a form of passive heat exchanger to transfer the heat generated by battery bank 136 (or other internal components) to the cooling air 306 (or other fluid) where it is dissipated away from the battery bank 136 into contact with the inner surface of the skin of the nacelle 140 as indicated by arrow 504. As explained above, the skin of the nacelle 140 is cooled by the cooling air 308 passing along the outer surface of the nacelle 140. The heat sink 502a may be fabricated from a material with a high thermal conductivity value such as, for example, aluminum alloys (e.g., aluminum alloy 1050). The heat sink 502a may comprise one or more fins or ribs to increase its surface area and, therefore, heat dissipation.

With reference to FIG. 5c, in other examples, the heat exchanger 502 is a centrifugal fan 502b. The centrifugal fan 502b can be used to redirect cooling air 306 outward from the fluid pathway 208, between battery packs 202, and into contact with the inner surface of the skin of the nacelle 140. In this example, after passing between battery packs 202, the cooling air 306 is again cooled by the skin of the nacelle 140 due to the cooling air 308 passing along the outer surface of the nacelle 140.

FIG. 6 illustrates a flow chart of an example method 600 of manufacturing a propulsion system 110 for an aircraft 100. The propulsion system 110 may be, for example, a LRU.

At step 602, an electric motor 118 is electrically coupled, via a controller 128, to a battery bank 136. The battery bank 136 defining a fluid pathway 208 therethrough. The electric motor 118 being configured to rotate a rotor 120.

At step 604, a thermal management system 138 is operably coupled to the electric motor 118. The thermal management system 138 may comprise, for example, a heat exchanger 402, a fan 302, or the like.

At step 606, the controller 128 is configured to drive the electric motor 118 using power from a battery bank 136. In some examples, the electric motor 118 is further configured to drive the thermal management system 138 to urge fluid through the fluid pathway 208.

At step 608, in some examples, the controller 128 is further configured to charge and discharge the battery bank 136.

At step 610, in examples where the battery bank 136 comprises a plurality of battery packs 202, a heat exchanger 502 may be positioned between each of the plurality of battery packs 202. The heat exchanger 502 may include one or more of a fan e.g., a centrifugal fan, a heat sink, etc.

At step 612, in some examples, the electric motor 118, the controller 128, the thermal management system 138, and the battery bank 136 are positioned in a nacelle 140. For example, the thermal management system 138 may be configured to urge fluid from a forward end of the nacelle 140 to an aft end of the nacelle 140 via the fluid pathway 208.

FIG. 7 illustrates a flow chart of an example method 700 of cooling a propulsion system 110 in an aircraft 100.

At step 702, the controller 128 controls charge and discharge of a battery bank 136. As explained above, the battery bank 136 defines a fluid pathway 208 therethrough.

At step 704, the controller 128 drives an electric motor 118 to rotate a rotor 120. The electric motor 118 derives power from the battery bank 136, for example. In other examples, the motor may alternatively or additionally derive power from solar panels, a generator, etc.

At step 706, the controller 128 drives a thermal management system 138 via the electric motor 118 that is configured to urge fluid through the fluid pathway 208. The thermal management system 138 may comprise, for example, a heat exchanger 402, a fan 302, or the like.

In some examples, the battery bank 136, the electric motor 118, the controller 128, and the thermal management system 138 are each positioned in a nacelle 140. For example, the thermal management system 138 may be configured to urge fluid from a forward end 140a of the nacelle 140 to an aft end 140b of the nacelle 140 via the fluid pathway 208.

Further, the disclosure comprises examples according to the following clauses:

Clause 1. A method of manufacturing a propulsion system 110 for an aircraft 100, the method comprising: electrically coupling, via a controller 128, a motor 118 to a battery bank 136 that defines a fluid pathway 208 therethrough, wherein the motor 118 is configured to rotate a rotor 120; operably coupling a thermal management system 138 to the motor 118; and configuring the controller 128 to drive the motor 118 using power from a battery bank 136, wherein the motor 118 is configured to drive the thermal management system 138 to urge fluid through the fluid pathway 208.

Clause 2. The method of clause 1, further comprising the step of configuring the controller 128 to charge and discharge the battery bank 136.

Clause 3. The method of clauses 1-2, wherein the battery bank 136 comprises a plurality of battery packs 202 connected electrically in parallel, wherein the method further comprises positioning a heat exchanger 502 between each of the plurality of battery packs 202.

Clause 4. The method of clause 3, wherein the heat exchanger 502 is a centrifugal fan.

Clause 5. The method of clause 3, wherein the heat exchanger 502 is a heat sink.

Clause 6. The method of clauses 1-5, further comprising the step of positioning the motor 118, the controller 128, the thermal management system 138, and the battery bank 136 in a nacelle 140.

Clause 7. The method of clause 6, wherein the thermal management system 138 is configured to urge fluid from a forward end of the nacelle 140 to an aft end of the nacelle 140 via the fluid pathway 208.

Clause 8. The method of clauses 1-7, further comprising the step of configuring the propulsion system 110 as a line-replaceable unit LRU.

Clause 9. The method of clauses 1-8, wherein the thermal management system 138 comprises a heat exchanger 402.

Clause 10. The method of clauses 1-9, wherein the thermal management system 138 comprises a fan 302.

Clause 11. A propulsion system 110 for an aircraft 100, the propulsion system 110 comprising: a battery bank 136 that defines a fluid pathway 208 therethrough; a motor 118 configured to rotate a rotor 120 via a rotor shaft 120c; a controller 128 configured to drive the motor 118; and a thermal management system 138 configured to urge fluid through the fluid pathway 208.

Clause 12. The propulsion system 110 of clause 11, wherein the battery bank 136 comprises a plurality of battery packs 202 connected electrically in parallel.

Clause 13. The propulsion system 110 of clauses 11-12, wherein each of the plurality of battery packs 202 comprises a plurality of battery cells 204.

Clause 14. The propulsion system 110 of clause 13, wherein the plurality of battery cells 204 are arranged to define a ring, wherein the fluid pathway 208 passes through said ring.

Clause 15. The propulsion system 110 of clauses 12-14, wherein the plurality of battery packs 202 are removably coupled to one another.

Clause 16. The propulsion system 110 of clauses 11-15, wherein the motor 118 is configured to drive the thermal management system 138.

Clause 17. The propulsion system 110 of clause 16, wherein the thermal management system 138 comprises a heat exchanger 402.

Clause 18. The propulsion system 110 of clause 16, wherein the thermal management system 138 comprises a fan 302.

Clause 19. The propulsion system 110 of clause 18, wherein the fan 302 is mechanically coupled to the rotor shaft 120c.

Clause 20. The propulsion system 110 of clause 11-19, wherein a heat exchanger 502 is provided between each of the plurality of battery packs 202.

Clause 21. The propulsion system 110 of clause 20, wherein the heat exchanger 502 is a centrifugal fan.

Clause 22. The propulsion system 110 of clause 20, wherein the heat exchanger 502 is a heat sink.

Clause 23. The propulsion system 110 of clauses 19-22, wherein the controller 128 is configured to control charge and discharge of the battery bank 136.

Clause 24. The propulsion system 110 of clauses 19-22, wherein the controller 128 is integrated with the motor 118.

Clause 25. The propulsion system 110 of clauses 11-24, wherein the fluid is a gas.

Clause 26. The propulsion system 110 of clauses 11-24, wherein the fluid is a liquid.

Clause 27. The propulsion system 110 of clauses 11-26, wherein the battery bank 136, the motor 118, the controller 128, and the thermal management system 138 are each positioned in a nacelle 140.

Clause 28. The propulsion system 110 of clauses 11-27, wherein the motor 118 is provided at a forward end of the nacelle 140, a tail cone 134 is positioned at an aft end of the nacelle 140, and the battery bank 136 is positioned aft of the motor 118 and forward of the tail cone 134.

Clause 29. The propulsion system 110 of clauses 11-28, wherein the battery bank 136, the motor 118, the controller 128, and the thermal management system 138 are each positioned in a nacelle 140 and configured as a line-replaceable unit LRU.

Clause 30. The propulsion system 110 of clauses 11-29, wherein the plurality of battery cells 204 are lithium battery cells.

Clause 31. The propulsion system 110 of clause 30, wherein the lithium battery cells are cylindrical cells.

Clause 32. The propulsion system 110 of clause 30, wherein the lithium battery cells are pouch cells.

Clause 33. A method of cooling a propulsion system 110 in an aircraft 100, the method comprising: controlling, via a controller 128, charge and discharge of a battery bank 136, wherein the battery bank 136 defines a fluid pathway 208 therethrough; driving, via the controller 128, a motor 118 to rotate a rotor 120, wherein the motor 118 derives power from the battery bank 136; and driving, via the motor 118, a thermal management system 138 that is configured to urge fluid through the fluid pathway 208.

Clause 34. The method of clause 33, wherein the battery bank 136, the motor 118, the controller 128, and the thermal management system 138 are each positioned in a nacelle 140, wherein the thermal management system 138 is configured to urge fluid from a forward end of the nacelle 140 to an aft end of the nacelle 140 via the fluid pathway 208.

Clause 35. The method of clauses 33-24, wherein the thermal management system 138 comprises a heat exchanger 402.

Clause 36. The method of clauses 33-24, wherein the thermal management system 138 comprises a fan 302.

While particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law. It will be appreciated that the methods and systems described above are set forth by way of example and not of limitation. Numerous variations, additions, omissions, and other modifications will be apparent to one of ordinary skill in the art.

What is claimed is:

1. A propulsion system for an aircraft, the propulsion system comprising:
    a battery bank that defines a fluid pathway therethrough;
    a motor configured to rotate a rotor via a rotor shaft;
    a controller configured to drive the motor; and
    a thermal management system configured to urge fluid through the fluid pathway.

2. The propulsion system of claim 1, wherein the battery bank comprises a plurality of battery packs connected electrically in parallel.

3. The propulsion system of claim 2, wherein each of the plurality of battery packs comprises a plurality of battery cells.

4. The propulsion system of claim 3, wherein the plurality of battery cells are arranged to define a ring, wherein the fluid pathway passes through said ring.

5. The propulsion system of claim 2, wherein the plurality of battery packs are removably coupled to one another.

6. The propulsion system of claim 1, wherein the motor is configured to drive the thermal management system.

7. The propulsion system of claim 6, wherein the thermal management system comprises a heat exchanger.

8. The propulsion system of claim 6, wherein the thermal management system comprises a fan.

9. The propulsion system of claim 2, wherein a heat exchanger is provided between each of the plurality of battery packs.

10. The propulsion system of claim 2, wherein the controller is configured to control charge and discharge of the battery bank.

11. The propulsion system of claim 2, wherein the battery bank, the motor, the controller, and the thermal management system are each positioned in a nacelle.

12. The propulsion system of claim 11, wherein the motor is provided at a forward end of the nacelle, a tail cone is positioned at an aft end of the nacelle, and the battery bank is positioned aft of the motor and forward of the tail cone.

13. The propulsion system of claim 8, wherein the plurality of battery cells are lithium battery cells.

* * * * *